Figure 4:
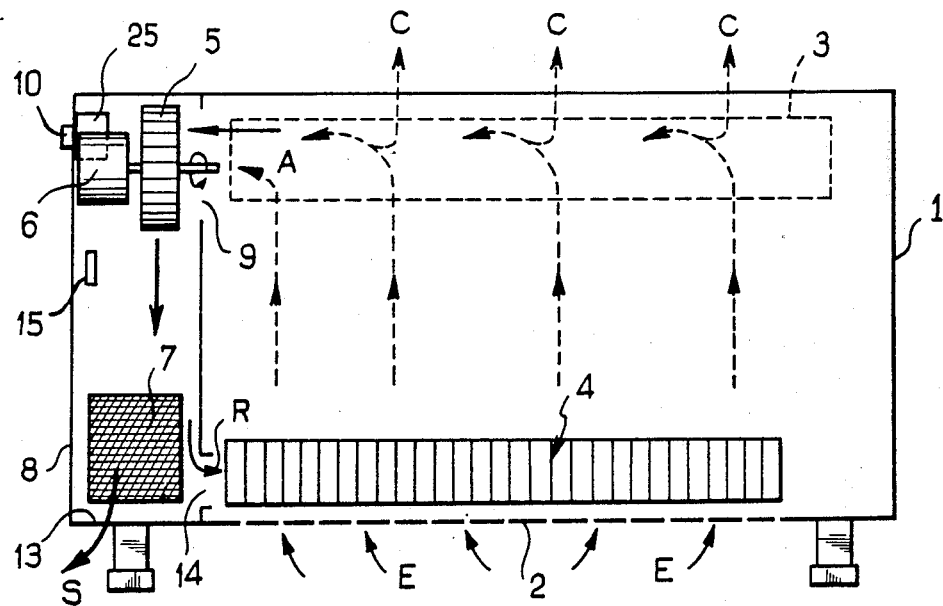

United States Patent [19]

Hennuy et al.

[11] Patent Number: 4,912,300

[45] Date of Patent: Mar. 27, 1990

[54] CONTROL DEVICE FOR HEATING APPLIANCE HAVING TWO OPERATING REGIMES

[75] Inventors: Jean Hennuy, Villefranches/Saone; Guy Wojcik, Lyons, both of France

[73] Assignee: SEB S.A., Selongey, France

[21] Appl. No.: 246,669

[22] PCT Filed: Dec. 9, 1987

[86] PCT No.: PCT/FR87/00489

§ 371 Date: Aug. 5, 1988

§ 102(e) Date: Aug. 5, 1988

[87] PCT Pub. No.: WO88/04448

PCT Pub. Date: Jun. 16, 1988

[30] Foreign Application Priority Data

Dec. 10, 1986 [FR] France ................... 86 17280

[51] Int. Cl.4 ............................................. F24D 19/00
[52] U.S. Cl. .................................. 219/364; 219/370; 219/486; 219/511
[58] Field of Search ............... 219/364, 369, 370, 483, 219/486, 487, 511

[56] References Cited

U.S. PATENT DOCUMENTS

| 4,085,309 | 4/1978 | Godel et al. ............ 219/364 |
| 4,170,729 | 10/1979 | Lane et al. ............ 219/364 |
| 4,604,516 | 8/1986 | Metz ..................... 219/364 |

FOREIGN PATENT DOCUMENTS

| 0190956 | 8/1986 | European Pat. Off. . |
| 1120098 | 12/1961 | Fed. Rep. of Germany . |
| 2576673 | 3/1987 | France . |
| 800938 | 9/1958 | United Kingdom . |

Primary Examiner—Philip H. Leung
Assistant Examiner—Jeffrey A. Gaffin
Attorney, Agent, or Firm—Young & Thompson

[57] ABSTRACT

The control device (25) comprises a thermostat (15) interconnected between a supply source (S) and a heating resistor (4) which comprises two heating elements (41, 42), one of which (42) is supplied only during one of the heating regimes. A temperature limiter (18) is interconnected between the source (S) and the heating element (42). This temperature limiter is sensitive to the heat produced by a resistor (17) having a high resistance value so as to cut-off the supply of said heating element (42) at the time of initial opening of the switch (15a) of the thermostat (15). The device (25) is particularly applicable to electric convectors having a natural convection regime and a blowing regime.

2 Claims, 3 Drawing Sheets

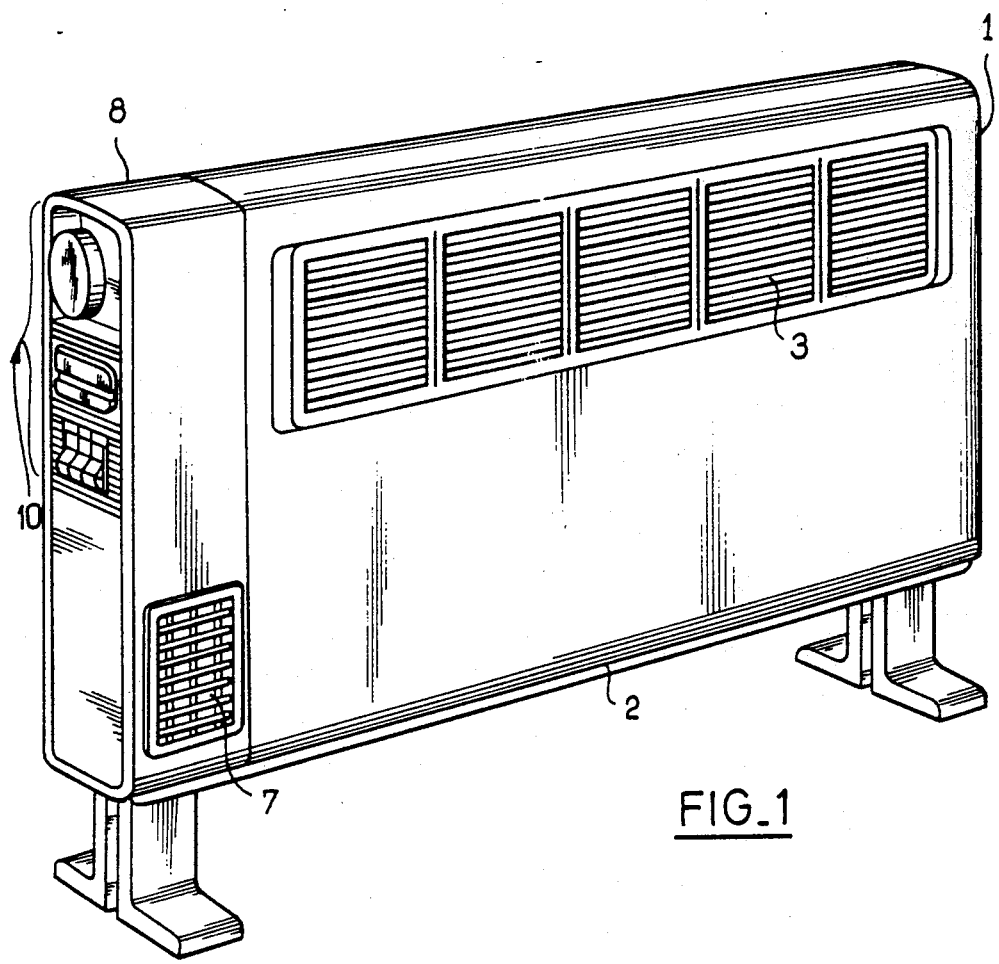
FIG_1
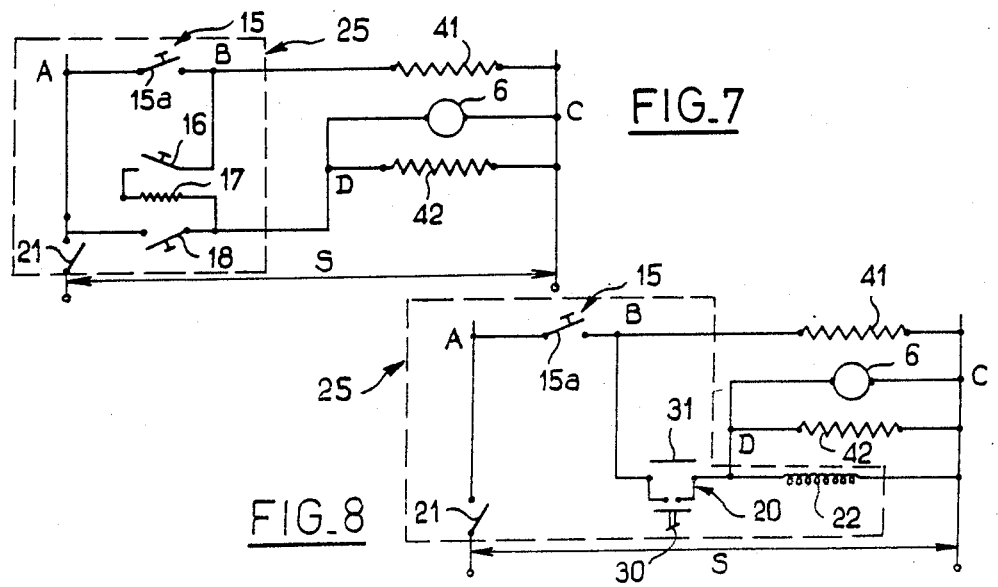
FIG_7
FIG_8

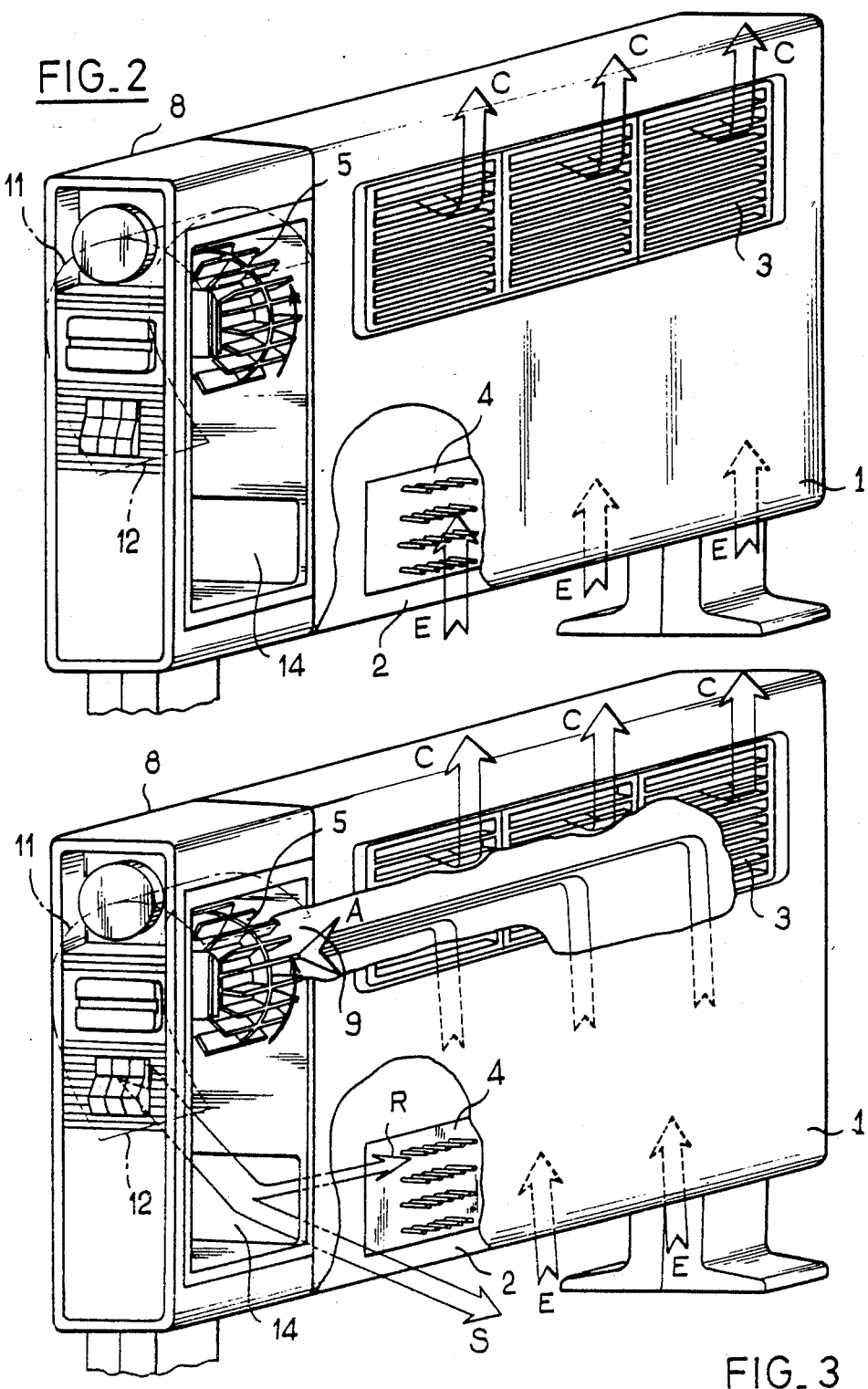

CONTROL DEVICE FOR HEATING APPLIANCE HAVING TWO OPERATING REGIMES

The present invention relates to a control device for a heating appliance such as a convector with electric heating resistors having two operating regimes, the first being a natural convection regime and the second being an air-blowing regime obtained by means of a blowing unit.

This type of convector is primarily intended for heating premises. It usually has two operating power levels. Thus the convector is first employed at full power in the blowing regime so as to permit a rapid temperature rise of the premises without any interruption of power supply and then, when the reference temperature is attained, at low power without blowing and in the natural convection regime, the temperature of the premises being in that case regulated for example by means of an electronic on/off thermostat or the like.

The dimensions of the convector of the abovementioned type must be such that, in any operating regime, the temperature of its different parts which are accessible to the user do not exceed maximum permissible values or else values laid down by the manufacturer on the basis of even more stringent quality standards.

In electric convectors having two operating regimes which are already known, one regime is of the forced convection type in which air is sucked-in from the exterior of the convector, passes through the heating resistor and is then blown to the exterior into the premises to be heated. In this design, egress of hot air takes place through one or a number of outlet grids, the arrangement of which in the upper portion of the convector is essentially adapted to operation in the natural convection regime.

Investigations made by the present Applicant have in fact shown that, psychologically, users prefer that, in the blowing regime or in other words in the forced convection regime in this case, hot air should be delivered in front of the convector and in the lower portion of this latter.

As disclosed in patent No. FR-A-2,576,673 in the name of the present Applicant, there is also known an electric convector having an enclosure forming a convection chimney which has a bottom air delivery opening and a top air delivery opening. The resistance element is placed within the enclosure downstream of the bottom air admission opening. In this design, an impeller is placed within the enclosure in order to extract part of the hot air formed by natural convection within the convection chimney and in order to blow part of this air through an additional hot-air delivery opening formed in the front wall of the enclosure. A convector of this type operates in the two regimes aforesaid, changeover from one to the other being carried out manually by the user.

The present invention also has for its object to propose a control device for heating appliances of the type aforesaid which permits automatic regulation of the operating regimes of these appliances and which is of simple design.

In accordance with the invention, the control device for the aforementioned appliance, in which a thermostat is interconnected between the source of supply and the heating resistor comprising two heating elements, one of which is supplied only during one of the regimes of this appliance, is characterized in that a temperature limiter is interconnected between the source and said heating element which is supplied only during one of the regimes of the appliance, this temperature limiter being sensitive to the heat produced by a resistor having a high resistance value so as to cut-off the supply of said heating element at the time of initial opening of the thermostat switch.

In an alternative embodiment, said control device is characterized in that a resettable relay is interconnected between the thermostat and said heating element which is supplied only during one of the regimes, the coil of said relay being mounted in parallel with said element so as to ensure that the relay opens in order to cut-off the supply of said element at the time of initial opening of the thermostat switch.

Thus the combination of a thermostat and temperature limiters or of a relay permits automatic changeover from the blowing regime to the natural convection regime and on/off regulation in the latter operating regime.

Moreover, the blowing element is supplied in parallel with the heating element which is supplied only in the blowing regime of the heating appliance.

Other characteristic features and advantages of the invention will also be brought out by the description which now follows.

Figure 5:
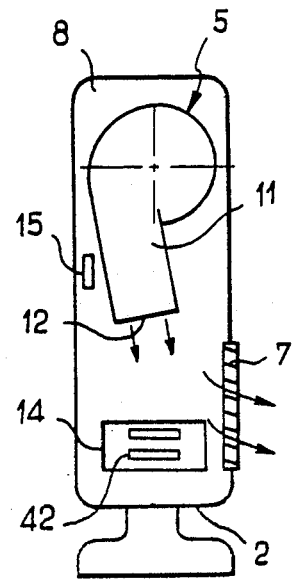
Figure 6:
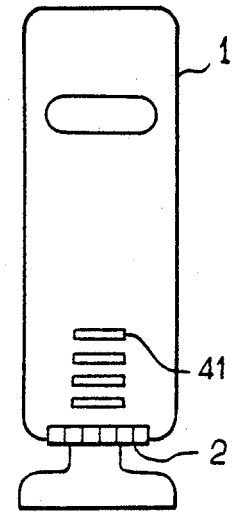

In the accompanying drawings which are given by way of non-limitative example:

FIG. 1 is a perspective view of a convector in accordance with the invention,

FIGS. 2 and 3 are perspective views of said convector, with portions broken away, showing the two operating regimes, FIG. 4 is a schematic longitudinal sectional view showing the interior of the convector and the air-flow paths in the blowing regime, FIGS. 5 and 6 are schematic side views with portions broken away showing the respective end walls of the convector, FIG. 7 is an electrical diagram of a control device in accordance with the invention, and FIG. 8 is an electrical diagram of a control device in an alternative embodiment of the invention.

In the embodiment of FIGS. 1 to 6, the electric convector includes an enclosure 1 of steel sheet forming a convection chimney, which has a bottom opening 2 for the admission of air and a top opening 3 for the discharge of air. The electric resistor 4 is placed (see FIG. 4) within the enclosure 1 directly above the bottom opening 2 for the admission of air. In practice, this resistor 4 is made up of two heating elements 41, 42 which can be supplied separately as will become apparent hereinafter.

The interior of said enclosure 1 contains in addition an impeller 5 driven in rotation by a motor 6 so as to extract, in the blowing regime, part of the hot air formed by natural convection within the convection chimney and so as to blow this air through an additional hot-air delivery opening 7 (see FIGS. 1 and 4) formed in the enclosure 1.

It is apparent from FIGS. 4 and 5 that the blowing impeller 5 is rotatably mounted within a compartment 8 arranged on one side of the enclosure 1, provision being made in the axis of the impeller 5 for an opening 9 which communicates with the interior of the enclosure 1 whilst the additional air-blowing opening 7 is provided on one face of said compartment 8 which is located opposite to the impeller 5 in the bottom portion of this compartment. Moreover, the impeller 5 is mounted within a housing 11 in the form of a volute, the air outlet 12 of which is directed towards the bottom wall 13 of the compartment 8 and towards the front face of this latter in which is formed the opening 7 (see FIG. 5).

In the embodiment illustrated in FIGS. 3 and 4, the compartment 8 is provided in the vicinity of its bottom wall 13 with a second opening 14 which communicates with the interior of the enclosure 1 opposite to the heating resistor 4. As will be brought out in greater detail in the description of operation, this opening 14 serves in the blowing regime, to reinject part of the air drawn from the compartment 8 by the impeller 5, into the enclosure 1 on the heating elements 41, 42. The opening 14 is smaller in crosssection than the additional air delivery opening 7.

With reference to FIGS. 7 and 8, the control device 25 includes a thermostat 15 for adjusting the reference temperature. The thermostat 15 is placed (FIG. 4) within the compartment 8 in a region which is not affected by the hot air stream blown by the impeller 5, for example behind the volute 11. One of the terminals A of the switch 15a of the thermostat 15 is connected to the electric supply source S of the convector whilst its other terminal B is connected to one of the terminals of the heating element 41 which is intended to be supplied both in the natural convection regime and in the blowing regime. The other terminal of the heating element 41 is connected to the source S.

In FIG. 7, a temperature limiter 18 such as a thermal switch, for example, is interconnected between the source S and one of the terminals D of the heating element 42 which is intended to be supplied only in the blowing regime. The limiter 18 is designed and arranged within the circuit of the control device 25 so as to be sensitive to the heat produced by a heating resistor 17 having a high value of resistance, for example a value within the range of 16 to 20 k, in order to open when this heating resistor is supplied and thus to cut-off the normal supply of the heating element 42.

The heating resistor 17 is mounted in series with a second temperature limiter 16 between that terminal D of the limiter 18 which is connected to the heating element 42 and the terminal B of the switch 15a. This temperature limiter 16 is also designed and arranged within the circuit of the device 25 so as to be sensitive to the heat produced by the heating resistor 17 and to open when said heating resistor is supplied. It will preferably be ensured that the limiter 16 opens substantially at the same time as the limiter 18.

Moreover, the motor 6 of the impeller 5 is mounted in parallel with the heating element 42 between the terminal D and the source S. A switch 21 interconnected between the source S and the terminal A permits turn-on or turn-off of the convector.

The heating element 41 preferably has a power of 1000 W whilst the element 42 has a power of 500 W or 1000 W in order to obtain a total power of 1500 or 2000 W in the blowing regime.

The control device 25 is preferably placed within the compartment 8 opposite to the external control elements 10 of the convector.

The operation is as follows:

The thermostat 15 having been set at its reference temperature such as 20° C., for example, and the convector being connected to the source S, the switch 21 is then placed in the closed position whilst the switch 15a of the thermostat 15 is also closed. The temperature limiters 16, 18 are closed since they are not subjected to any temperature rise, the heating resistor 17 being shunted by the portions of circuit AB and AD. The points of connection A and C are enabled and the heating elements 41 and 42 as well as the motor 6 of the impeller 5 are supplied with current.

In this blowing regime of the convector, the air streams are oriented as represented by the arrows in FIG. 3. An air stream E enters the enclosure 1 through the bottom opening 2, passes through the heating elements 41 and 42 and rises within the convection chimney of the enclosure 1. A portion C of the hot air stream E is evacuated to the exterior through the top outlet 3 whilst the other portion A is drawn into the compartment 8 through the opening 9 under the action of the impeller 5 and is discharged by this latter towards the bottom wall 13 of the compartment 8. Under these conditions, a portion S of the stream A is discharged to the exterior through the opening 7 at a distance from the opening 2 and with an orientation with respect to said opening 2 which prevents it from returning into the enclosure 1 through said opening whilst the other portion R is reinjected through the opening 14 into the enclosure 1 on the heating elements 41 and 42.

Tests performed by the present Applicant have shown that the stream R represents ten to twenty per cent of the stream A whilst the stream C which passes out of the enclosure 1 through the opening 3 is higher by fifteen to twenty-five per cent than the stream which would pass out of said opening 3 in the absence of the opening 14. The difference of five per cent with respect to the ratio A/R is justified a priori by the increase in velocity of the airflow within the convection chimney as a result of a reduction in overall pressure drops. By virtue of relative cooling of the heating elements 41 and 42 and efficient stirring of the airflow within the convection chimney by the stream R, the mean temperature of the stream C is reduced, thereby correlatively cooling the walls of the enclosure 1 and the grids which partially close the air outlet 3. Moreover, the hot air stream S blown through the outlet 7 provides a very distinct improvement in heating comfort since the majority of users highly appreciate blowing of hot air in the lower portion and on the front face of the convector.

When the temperature of the room comes close to the reference temperature (for example 20° C.), the switch 15a of the thermostat 15 opens the circuit ABC. Taking into account the high value of resistance of the heating resistor 17, a current of low intensity then circulates within the circuit which connects in series the source S, the heating resistor 17 and the element 41. This current of low intensity heats-up the heating resistor 17 to a sufficient extent to open the limiters 16 and 18. Thus the elements 41 and 42 no longer generate heat and the impeller 5 no longer operates.

When the temperature of the room falls below the reference temperature, the switch 15a of the thermostat 15 again closes, with the result that the element 41 is again supplied at its maximum intensity and heatsup again. Since the limiters 16 and 18 are still in the open position, the element 42 does not generate any heat and the impeller 5 still does not operate.

Thus the control device 25 in accordance with the invention ensures on/off regulation in the natural convection regime. At any moment, the limiters 16 and 18 may be reclosed, with the result that the convector again operates in the cycle described in the foregoing which begins with the air-blowing regime.

In FIG. 8 which illustrates an alternative embodiment of the control device 25, the terminals of the circuit of said device 25 are designated by the same letters as in FIG. 7. A relay 20 which can be reset by a resetting push-button 30 is interconnected between the terminals B and D of the circuit of the device 25. The relay 20 is maintained in the closed position after engagement of the push-button 30 by supplying the relay coil 22 which is mounted in parallel with the terminals D and C.

The operation is as follows:

when the thermostat 15 has been set at its reference temperature and the convector has been connected to the source S, the switch 21 and the relay 20 are then placed in the closed position whilst the switch 15a of the thermostat 15 is also closed. The connection points A, B, C and D are under tension and the heating elements 41 and 42 as well as the motor 6 of the impeller 5 are supplied with current. The convector then operates in the blowing regime.

When the temperature of the room comes close to the reference temperature, the thermostatic switch 15a opens the circuit ABC, with the result that the coil 22 is no longer supplied. The contact 31 of the relay 20 then opens, with the result that the elements 41 and 42 no longer heat-up and the impeller 5 no longer operates.

When the temperature of the room falls below the reference temperature, the switch 15a again closes, with the result that the element 41 again begins to heat-up. Since the coil 22 is still not supplied, the relay 20 remains closed, with the result that the element 42 does not heat-up and that the impeller 5 does not operate either. At the following turn-on of the convector, if the relay 20 is reset, the convector again operates in accordance with the above-described cycle which starts with the blowing regime.

By virtue of a particularly simple design, the control device 25 which has just been described thus ensures automatic changeover from the blowing regime to the on/off regulated natural convection regime.

As will be readily apparent, the control device which has just been described is applicable to any electric heating appliance having two heating regimes.

We claim:

1. Control device for electric heating apparatus, comprising two heating resistors (41, 42), a supply source (S) for said heating resistors, a thermostat (15a) having two terminals (A, B), one of said terminals being connected to said supply source (S) and the other said terminal (B) being connected to one (41) of said heating resistors, a first temperature limiter (18) having two terminals, one of said terminals being connected to said supply source (S) and the other said terminal (D) being connected to the other said heating resistor (42), a third heating resistor (17) being connected between said other terminal (B) of the thermostat (15a) and said other terminal of said first temperature limiter (18), a second temperature limiter (16) being connected between said third resistor (17) and said other terminal (B) of the thermostat (15a), said two temperature limiters (16, 18) being resettable in closed position and being sensitive to the heat of said third resistor (17) when it is traversed by a current, said third resistor (17) having an ohmic value such that said third resistor (17) is traversed by a negligible current when said thermostat (15a) is closed, and when said thermostat is open to heat said temperature limiters (16, 18) to open said limiters and cut-off the supply of said two heating resistors (41, 42).

2. Control device for electric heating apparatus, comprising two heating resistors (41, 42), a supply source (S) for said heating resistors, a thermostat (15a) having two terminals (A, B), one of said terminals being connected to said supply source (S) and the other said terminal (B) being connected to one (41) of said heating resistors, a relay (20) that can be reset by a resetting button (30), said relay being interconnected between said other terminal (B) and said other heating resistor (42), said relay (20) having a relay coil (22) connected in parallel with said other heating resistor (42), said relay coil (22) maintaining said relay in closed position when it is supplied with current.

* * * * *